United States Patent
Przybysz et al.

(10) Patent No.: US 8,175,576 B2
(45) Date of Patent: May 8, 2012

(54) METHOD AND APPARATUS FOR USE IN A COMMUNICATIONS NETWORK

(75) Inventors: Hubert Przybysz, Hägersten (SE); Timo Forsman, Älvsjö (SE); Ana Maria Lopez Nieto, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 640 days.

(21) Appl. No.: 12/278,487

(22) PCT Filed: Feb. 7, 2006

(86) PCT No.: PCT/EP2006/050731
§ 371 (c)(1), (2), (4) Date: Apr. 8, 2009

(87) PCT Pub. No.: WO2007/090463
PCT Pub. Date: Aug. 16, 2007

(65) Prior Publication Data
US 2009/0215454 A1 Aug. 27, 2009

(51) Int. Cl.
- *H04M 1/66* (2006.01)
- *H04M 3/00* (2006.01)
- *H04M 11/00* (2006.01)
- *H04W 4/00* (2009.01)

(52) U.S. Cl. ...... 455/406; 455/411; 455/418; 455/435.1

(58) Field of Classification Search .......... 455/410–411, 455/418, 422.1, 432.3, 435.1–435.3, 550.1, 455/556.2, 560–561, 405–408, 433, 435.1, 455/466, 514, 551; 709/217–219, 223, 225, 709/228–229, 202–203; 379/111, 114.03, 379/114.28, 115.02, 126, 127.05; 370/395.5, 370/395.52, 400–401, 408, 428–429; 705/12.55–14.57; 726/1–6, 12, 14, 17, 726/21

See application file for complete search history.

(56) References Cited

U.S. PATENT DOCUMENTS

| | | | |
|---|---|---|---|
| 7,213,068 B1 * | 5/2007 | Kohli et al. | 709/225 |
| 2001/0056423 A1 * | 12/2001 | Kanazawa | 707/10 |
| 2003/0154404 A1 * | 8/2003 | Beadles et al. | 713/201 |

FOREIGN PATENT DOCUMENTS

WO WO 2004/071104 A2 8/2004

OTHER PUBLICATIONS

ETSI TS 124 228 v5.14.0 (Dec. 2005) "Digital Cellular Telecommunications System, UMTS, Signalling Flows for the IP Multimedia call control based on SIP and SDP".
3GPP TR 23.803 v7.0.0 (Sep. 2005) "Evolution of Policy Control and Charging".
3GPP TS 23.203 v 0.3.1 (Jan. 2006) "Policy and Charging Control Architecture".

\* cited by examiner

*Primary Examiner* — Meless Zewdu

(57) ABSTRACT

A method and apparatus for registering a mobile node such as a User Equipment (UE) of a UMTS telecommunications network with a subsystem of the network such as an IP Multimedia Subsystem (IMS). A Policy and Charging Rules Function (PCRF) node provides policy and charging rules, and a Gateway GPRS Support Node (GGSN) enforces the rules for traffic flows. The UE sends a registration request to the GGSN, which selects a PCRF. When a Proxy Call Session Control Function (P-CSCF) receives the registration request, the P-CSCF selects a candidate PCRF and validates the selection. If the candidate PCRF is the PCRF selected by the GGSN, the registration is successful. If not, the P-CSCF may select another PCRF and repeat the validation process.

19 Claims, 5 Drawing Sheets

METHOD AND APPARATUS FOR USE IN A COMMUNICATIONS NETWORK

BACKGROUND OF THE INVENTION

1. Field of the Invention

The present invention relates to a method and apparatus for use in a communications network, for example a Universal Mobile Telecommunications System having an IP Multimedia Subsystem.

2. Description of the Related Art

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

By way of background, UMTS (Universal Mobile Telecommunications System) is a third generation wireless system designed to provide higher data rates and enhanced services to subscribers. UMTS is a successor to the Global System for Mobile Communications (GSM), with an important evolutionary step between GSM and UMTS being the General Packet Radio Service (GPRS). GPRS introduces packet switching into the GSM core network and allows direct access to packet data networks (PDNs). This enables high-data rate packets switch transmissions well beyond the 64 kbps limit of ISDN through the GSM call network, which is a necessity for UMTS data transmission rates of up to 2 Mbps. UMTS is standardised by the $3^{rd}$ Generation Partnership Project (3GPP) which is a conglomeration of regional standards bodies such as the European Telecommunication Standards Institute (ETSI), the Association of Radio Industry Businesses (ARIB) and others. See 3GPP TS 23.002 for more details. The standardisation of UMTS has progressed in phases. The first phase was known as Release '99. The Release '99 specifications define the basic architecture that consists of the UMTS Terrestrial Radio Access Network (UTRAN), Circuit Switched Core Network (CS-CN) and Packet Switched Core Network (PS-CN). The release '99 specification offers traditional circuit as well as packet-switched services. The next phase in the standardisation process was Release 4, adding new services to the '99 architecture. Release 5 represented a significant shift, offering both traditional telephony as well as packet-switched services over a single converged packet-based network.

The UMTS Release 5 architecture added a new subsystem known as the IP Multimedia Subsystem (IMS) to the PS-CN for supporting traditional telephony as well as new multimedia services. IMS provides IP Multimedia services over mobile communication networks (3GPP TS 22.228, TS 23.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS.

FIG. 1 is an illustrative diagram showing a UMTS communications network 200 comprising a User Equipment (UE) 204 located within a Visited Network 202. The UE 204 is attached to a Serving GPRS Support Node (SGSN) 208 via a UTRAN 206, which is in turn in communication with a Gateway GPRS Support Node (GGSN) 210. Within the Visited Network 202, the GGSN 210 communicates with a Proxy Call Session Control Function (P-CSCF) 212, which is the first point of contact in the visited IMS network for the UE 204. The P-CSCF 212 forwards SIP registration messages and session establishment messages to the Home Network 214.

The first point of contact within the Home Network 214 is the Interrogating Call Session Control Function (I-CSCF) 216, which is an optional node in the IMS architecture, whose main purpose is to query the Home Subscriber Server (HSS) 220 to find the location of the Serving Call Session Control Function (S-CSCF) 218. The S-CSCF 218 performs session management for the IMS network, and there can be several S-CSCFs in the network. The HSS 220 is a centralised subscriber database, and has evolved from the Home Location Register (HLR) from earlier UMTS releases. The HSS 220 interfaces with the I-CSCF and the S-CSCF to provide information about the location of the subscriber and the subscriber's subscription information.

The communications network 200 further comprises an application server 222, a database 224 and a mail server 226 located in the Home Network 214. From the S-CSCF 218, signalling messages are passed to the intended destination, which may be another Release 5 IMS network 228 comprising a UE 230, or to a legacy network 232 comprising a PSTN interfaced through a Media Gateway Control Function (MGCF), or to an IP network 234.

Specific details of the operation of the UMTS communications network 200 and of the various components within such a network can be found from the Technical Specifications for UMTS which are available from http://www.3gpp.org.

Further details of the use of SIP within UMTS can be found from the 3GPP Technical Specification TS 24.228 V5.8.0 (2004 March), but a summary will now be provided with reference to FIG. 2, which illustrates schematically how the IMS fits into the mobile network architecture in the case of a GPRS/PS access network (IMS can of course operate over other access networks). Call/Session Control Functions (CSCFs) operate as SIP proxies within the IMS. As mentioned above, the 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select an S-CSCF if a S-CSCF is not already selected. The I-CSCF receives the required S-CSCF capabilities from the home network's Home Subscriber Server (HSS), and selects an appropriate S-CSCF based on the received capabilities. [It is noted that S-CSCF allocation is also carried out for a user by the I-CSCF in the case where the user is called by another party, and the user is not currently allocated an S-CSCF.] When a registered user subsequently sends a session request to the IMS, the P-CSCF is able to forward the request to the selected S-CSCF based on information received from the S-CSCF during the registration process.

Within the IMS service network, the Application Servers (ASs) are for implementing IMS service functionality. Application Servers provide services to end-users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from an HSS during the IMS registration procedure as part of a user's User Profile.

An important function of any mobile core network is the enforcement of service level policies. These policies dictate, inter alia, what particular users may and may not do, and what they will be charged. Another policy might dictate the Quality of Service (QoS) that particular users will receive. Service level policies, which might be thought of as general policy statements, are enforced using detailed policy "rules". A single policy may require a set of policy rules. Each policy rule will comprise a first subject part identifying the packets that the policy rule will be applied to, and a second action part. The subject part may in some cases be a packet filter. Policy rules are installed into a node through which all traffic of the users pass or into multiple nodes, which collectively handle all traffic of the user.

In the case of 3GPP, it is envisaged that policing and charging functionality will be controlled from a so-called Policy and Charging Rules Function (PCRF) logical node, based on signalling from Application Functions (AFs) providing high level services to users. Consider for example the IP Multimedia Subsystem (IMS) described above. When a call is set up over the IMS, the IMS Proxy Call/State Control Function (P-CSCF) acts as AF from a policy and charging point of view and informs the PCRF of the new session. In particular, the P-CSCF sends to the PCRF a descriptor of the IP flow, and an abstract definition of the QoS to apply. The PCRF has installed into it, for each user, a policy which describes how packet flows for that user are to be handled, i.e. allowed/denied services, charges, actual QoS, etc. (This may be installed manually into the PCRF or may be installed remotely, e.g. by a user's home network where the PCRF is located in a "visited" network.)

Considering this scenario in more detail, the AF sends to the PCRF a flow descriptor in the form of a complete or partial five-tuple vector containing: (1) IP source address, (2) IP destination address, (3) an identification of the used transport protocol (e.g., TCP or UDP), (4) source port number and (5) destination port number. The PCRF applies the policy to this vector to generate a set of policy rules. For example, the policy may specify the charge and QoS to be applied to a call between the IP addresses and port numbers contained in the vector. The resulting rules will contain the five tuple vector as the subject part and the appropriate charging and QoS actions in the action part. The PCRF installs the policy rules into the traffic node at which the rules will be enforced. If the addresses/port numbers of a packet passing through the enforcement node match the filter part of a rule, the action specified at that rule is carried out. The traffic node is referred to as the Policy Enforcement Function (PEF) and, in the case of a cellular network incorporating GPRS, is usually located in a GPRS Gateway Support Node (GGSN), or an evolution of the GGSN.

Flexible Bearer Charging (FBC) and Service Based Local Policy are two policy control architectures defined in 3GPP Rel-6 (TS 23.125 and TS 23.207 respectively). The two architectures are being harmonised for 3GPP Rel-7 into one Policy and Charging Control (PCC) architecture, in line with the evolution direction set out in TR 23.803. The policy functionality is distributed in the network across a number of entities: the Application Function (AF), the Policy Control and Charging Rules Function (PCRF), and the Gateway (GW), as shown in FIG. 3 of the accompanying drawings (from TR 23.803).

For Rel-6 policy control over Go the binding mechanism uses an Authorization Token and one or more Flow Identifiers. An important role for the token is to provide address information to the GGSN (GW) for finding the Policy Decision Function (PDF) that issued the token, thus being the node to contact for seeking authorization for the flows described by the Flow Identifiers. The Rel-6 Flow Based Charging architecture ensures that both the Traffic Plane Function (TPF) (in the GW) and an AF, which requires information being provided to the Charging Rules Function (CRF) for the user session, contacts the same CRF. For Flow Based Charging, the TPF contacts the CRF based on access point the UE connects to (i.e. Access Point Name, APN) and the AF contacts the CRF based on the end user (IP) address as experienced at the AF.

The Rel-7 PCC will re-use the Rel-6 FBC TPF to CRF addressing mechanism of Flow Based Charging for the GW to PCRF addressing. As the Flow Based Charging solves the problem of the AF finding the same CRF that the TPF contacts, the Rel-7 AF will re-use the Rel-6 AF to CRF addressing mechanism of Flow Based Charging for the AF to PCRF addressing. It is therefore the GW that will select the PCRF to be serving the UE, and the AF will ensure that it provides its authorisations to the same serving PCRF.

SUMMARY OF THE INVENTION

According to a first aspect of the present invention there is provided a method of registering a mobile node of a telecommunications network to a subsystem of the network, the network having at least one node for maintaining or having access to policy and charging rules for users of the network and at least one node for enforcement of the policy and charging rules to traffic flows, the method comprising receiving a registration request message from the mobile node at a proxy node of the network, selecting a candidate policy and charging rules node for the mobile node, determining whether the candidate policy and charging rules node has already been selected by a policy and charging rules enforcement node to serve the mobile node, and performing subsequent steps of the registration procedure in dependence on the determination.

The network may be a Universal Mobile Telecommunications System.

The mobile node may be a User Equipment of the Universal Mobile Telecommunications System.

The or each policy and charging rules node may comprise a Policy and Charging Rules Function of the Universal Mobile Telecommunications System.

The or each policy and charging rules enforcement node may comprise a Gateway Node of the Universal Mobile Telecommunications System, such as a Gateway GPRS Support Node.

The proxy node may comprise an Application Function of the Universal Mobile Telecommunications System.

The proxy node may comprise a Proxy Call Session Control Function of the Universal Mobile Telecommunications System.

The subsystem may be an IP Multimedia Subsystem.

The determining step may comprise sending a validation request from the proxy node to the candidate policy and charging rules node comprising information for use by the candidate policy and charging rules node in determining whether it has already been selected by a policy and charging rules enforcement node to serve the mobile node, and basing the determination on a reply received from the candidate policy and charging rules node.

The validation request may be sent as part of an Application Function session between the proxy node and the candidate policy and charging rules node.

The information may comprise an IP address of the mobile node.

The method may comprise checking whether the IP address of the mobile node is already stored in the candidate policy and charging rules node.

The method may comprise, if it is determined that the candidate policy and charging rules node has already been selected by a policy and charging rules enforcement node to serve the mobile node, continuing with steps to register the mobile node to the subsystem.

The method may comprise, if it is determined that the candidate policy and charging rules node has not already been selected by a policy and charging rules enforcement node to serve the mobile node, performing the selecting and determining steps again for one or more further candidate policy and charging rules node either until one is selected for which it is determined that it has already been selected by a policy and charging rules enforcement node to serve the mobile node or until there are no further candidates to select.

The method may comprise, if no candidate policy and charging rules node is selected for which it is determined that it has already been selected by a policy and charging rules enforcement node to serve the mobile node, rejecting the request to register the mobile node to the subsystem, at least in respect of the participating proxy node.

The method may comprise performing the steps again for a further proxy node.

According to a second aspect of the present invention there is provided an apparatus for use in registering a mobile node of a telecommunications network to a subsystem of the network, the network having at least one node for maintaining or having access to policy and charging rules for users of the network and at least one node for enforcement of the policy and charging rules to traffic flows, the apparatus comprising means for receiving a registration request message from the mobile node, means for selecting a candidate policy and charging rules node for the mobile node, means for determining whether the candidate policy and charging rules node has already been selected by a policy and charging rules enforcement node to serve the mobile node, and means for performing subsequent steps of the registration procedure in dependence on the determination.

According to a third aspect of the present invention there is provided a method for use by an apparatus as part of a method of registering a mobile node of a telecommunications network to a subsystem of the network, the apparatus being one of at least one node of the network for maintaining or having access to policy and charging rules for users of the network and the network having at least one node for enforcement of the policy and charging rules to traffic flows, the method comprising, following receipt at a proxy node of the network of a registration request message from the mobile node and the selection of the apparatus as a candidate policy and charging rules node for the mobile node, determining whether the candidate policy and charging rules node has already been selected by a policy and charging rules enforcement node to serve the mobile node, such that subsequent steps of the registration procedure can be performed in dependence on the determination.

According to a fourth aspect of the present invention there is provided an apparatus for use in a method of registering a mobile node of a telecommunications network to a subsystem of the network, the apparatus being one of at least one node for maintaining or having access to policy and charging rules for users of the network and the network having at least one node for enforcement of the policy and charging rules to traffic flows, the apparatus comprising means for determining, following the receipt at a proxy node of the network of a registration request message from the mobile node and the selection of the apparatus as a candidate policy and charging rules node for the mobile node, whether the candidate policy and charging rules node has already been selected by a policy and charging rules enforcement node to serve the mobile node, such that subsequent steps of the registration procedure can be performed in dependence on the determination.

According to a fifth aspect of the present invention there is provided an operating program which, when run on an apparatus, causes the apparatus to carry out a method according to the first or third aspect of the present invention.

According to a sixth aspect of the present invention there is provided an operating program which, when loaded into an apparatus, causes the apparatus to become apparatus according to the second or fourth aspect of the present invention.

The operating program may be carried on a carrier medium. The carrier medium may be a transmission medium. The carrier medium may be a storage medium.

DETAILED DESCRIPTION OF THE PREFERRED EMBODIMENTS

The present applicants have appreciated that above-described proposed 3GPP Rel-7 Policy and Charging Control (PCC) architecture specifications are missing aspects of redundancy to allow the entities implementing the policy control functions to pass responsibility over to alternative entities either due to failure of such entities or loss of communication between them.

The proposed specifications do not ensure that the P-CSCF discovered and selected for the UE to communicate with the IMS is the one able to act as an AF for the UE for the purposes of policy and charging control. As a result, the UE may successfully register to the IMS, but may later be prevented from using the IMS services when it attempts to invoke a service if the P-CSCF has selected a PCRF entity different from the PCRF entity serving the UE.

As a consequence of using an embodiment of the present invention, it is generally ensured, at the time the UE attempts to register to the IMS, that the P-CSCF is able to communicate with the correct PCRF entity serving the UE. This may be achieved by arranging for the P-CSCF to check with the selected PCRF that it is the correct one. The basic mechanism is for the P-CSCF that is discovered and selected by the UE to determine, at the time the UE is registering to the IMS, whether the PCRF entity the P-CSCF selects for the UE is the one already serving the UE.

Figure 1:
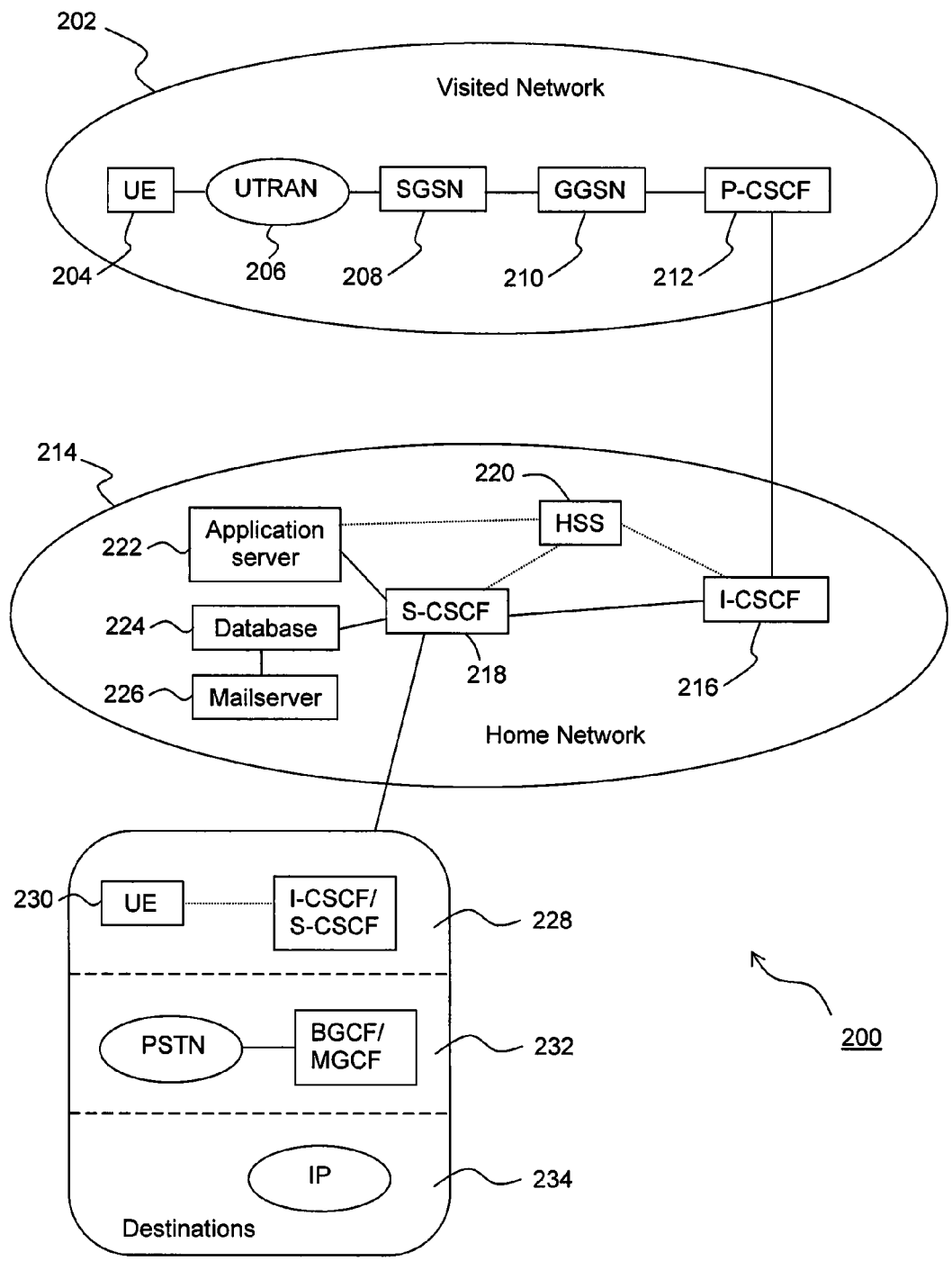
FIG. 1, discussed hereinbefore, is a schematic diagram illustrating parts of a UMTS network.
Figure 2:
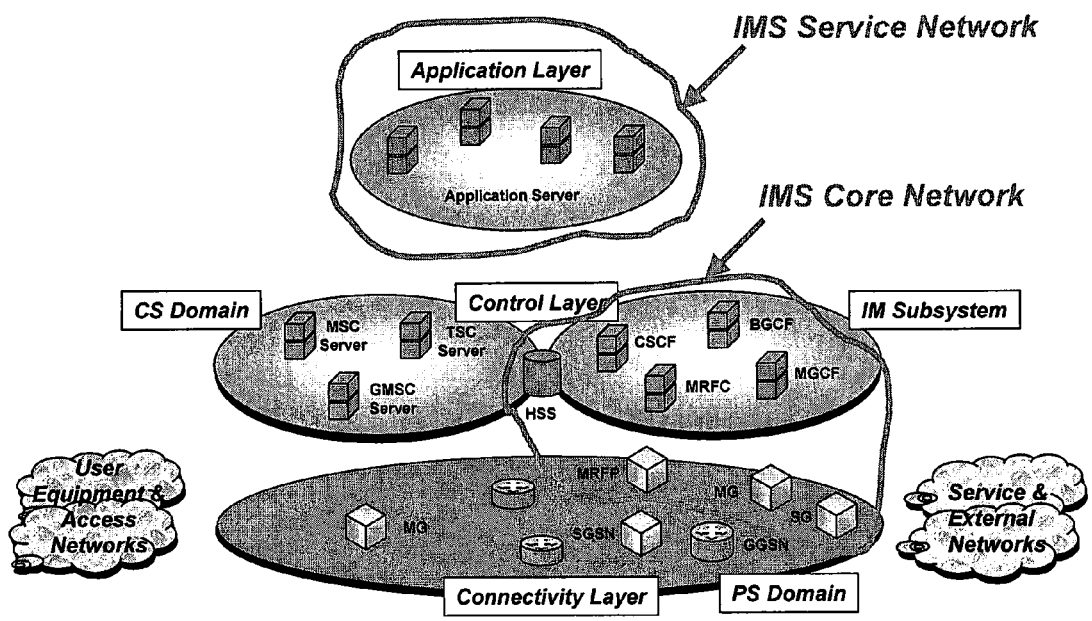
FIG. 2, also discussed hereinbefore, illustrates schematically the integration of an IP Multimedia Subsystem into a 3G mobile communications system.
Figure 3:
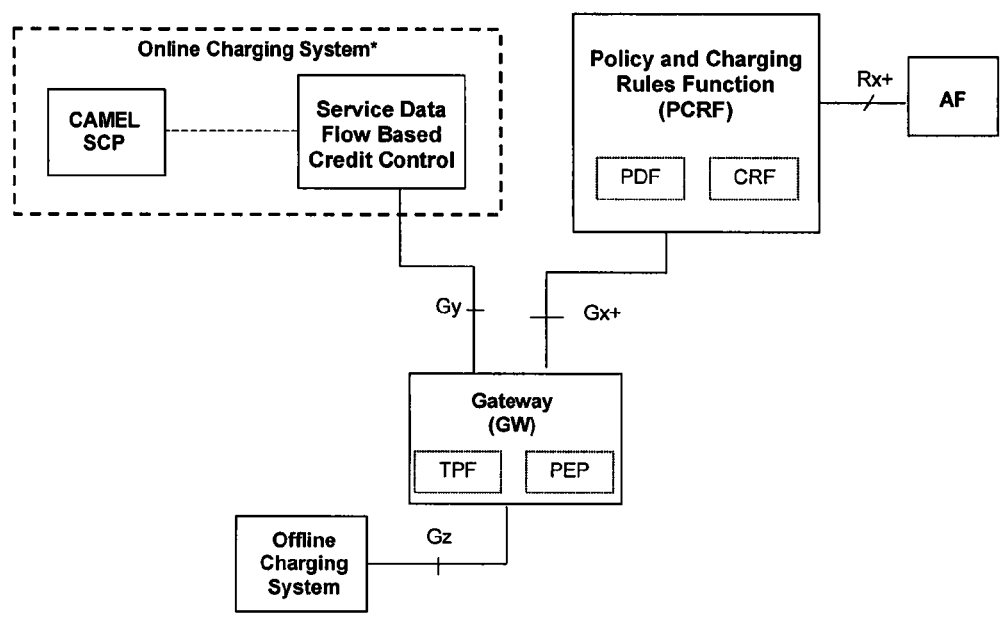
FIG. 3, also discussed hereinbefore, illustrates schematically the network entities proposed to handle policy functionality in 3GPP Rel-7.
Figure 4:
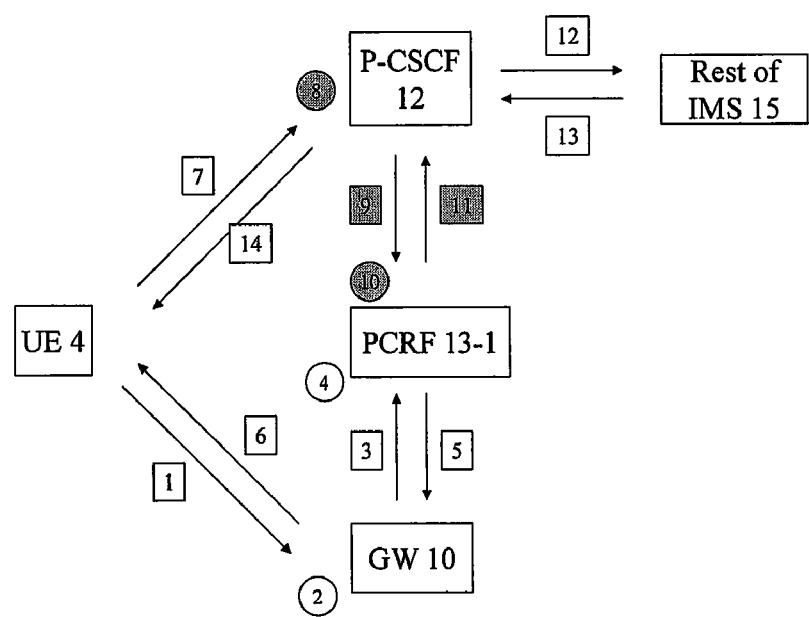
FIG. 4 schematically illustrates signalling flow according to an embodiment of the present invention in the case of successful IMS registration.
Figure 5:
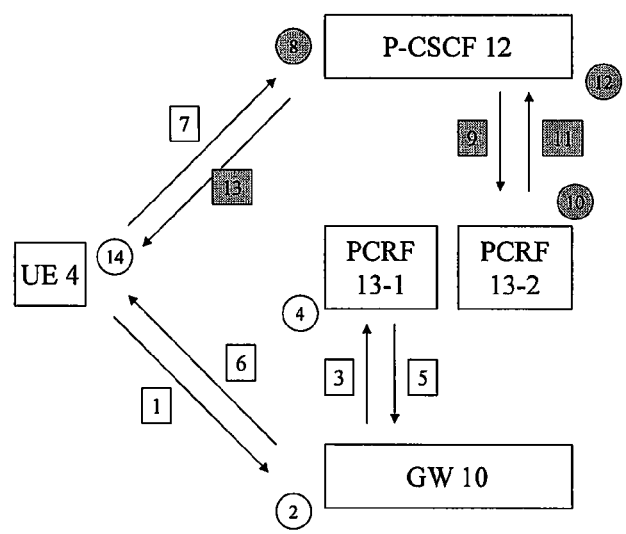
FIG. 5 schematically illustrates signalling flow according to an embodiment of the present invention in the case of unsuccessful IMS registration.

This concept will now be described in more detail with reference to FIGS. 4 and 5. FIG. 4 illustrates a UE 4, a Gateway (GW) 10, a P-CSCF 12, and a PCRF 13-1, with the rest of the IMS being represented by the part labelled 15. FIG. 5 shows many of the same parts as FIG. 4, except that two different PCRFs 13-1 and 13-2 are shown, while the rest of the IMS 15 is not shown. The signalling flow shown in FIG. 4 is for use in illustrating a case where registration to the IMS is ultimately successful, while the signalling flow shown in FIG. 5 is for use in illustrating a case where registration to the IMS is ultimately unsuccessful.

Reference will now be made to FIG. 4 to describe an example of successful IMS registration according to an embodiment of the present invention.

Step 1 of FIG. 4

The UE 4 sends a bearer request for use by the IMS signalling.

Step 2 of FIG. 4

The GW 10 may allocate an IP address to the UE 4, if not already allocated. The GW 10 selects one of the PCRF entities to serve the UE 4; in this example it selects the PCRF 13-1.

Step 3 of FIG. 4

The GW 10 sends an authorisation request to the PCRF 13-1, including the IP address of the UE 4.

Step 4 of FIG. 4

The PCRF 13-1 may create a state for the UE 4 and store its IP address, if not already created. The PCRF 13-1 authorises the bearer and its usage for IMS signalling according to a pre-configured policy. The PCRF 13-1 determines relevant PCC rules for the IMS signalling.

Step 5 of FIG. 4

The PCRF 13-1 sends a successful authorisation response with the PCC rules for the IMS signalling.

Step 6 of FIG. 4

The GW 10 sends a successful bearer response to the UE 4.

Step 7 of FIG. 4

The UE 4 discovers and selects the P-CSCF 12, and attempts to register to the IMS by sending a registration request (SIP REGISTER message) to the P-CSCF 12.

(Steps 1 to 7 of FIG. 4 are steps that can be carried out according to previously-proposed mechanisms.)

Step 8 of FIG. 4

When the P-CSCF 12 receives the registration request, it identifies from the request the IP address of the UE 4 attempting to register. The P-CSCF 12 selects one of the PCRF entities configured for the IP address, in this case the PCRF 13-1, and decides to check the validity of the selection.

(Selecting the PCRF entity at this point and deciding to check the validity of the selection has not been previously proposed.)

Step 9 of FIG. 4

The P-CSCF 12 sends a validation request to the selected PCRF 13-1 including the IP address identified in Step 8 of FIG. 4. As different implementation options, the validation request may either initiate a stand-alone transaction (unrelated to an AF session), or a new AF session. When an AF session is used for the validation, the P-CSCF 12 may create an association between this AF session and the IMS registration and/or the IMS signalling flow in the user plane.

(This step has not been previously proposed.)

Step 10 of FIG. 4

The PCRF 13-1 checks if it is serving this IP address. In this example, the result is successful.

(This step has not been previously proposed.)

Step 11 of FIG. 4

The PCRF 13-1 sends a successful validation response to the P-CSCF 12.

(This step has not been previously proposed.)

Steps 12 to 14 of FIG. 4

Successful registration to the IMS is concluded according to previously-proposed mechanisms.

Reference will now be made to FIG. 5 to describe an example of unsuccessful IMS registration according to an embodiment of the present invention.

Steps 1 to 7 of FIG. 5

These steps are the same as Steps 1 to 7 of FIG. 4 described above.

Step 8 of FIG. 5

When the P-CSCF 12 receives the registration request, it identifies from the request the IP address of the UE 4 attempting to register. The P-CSCF 12 selects one of the PCRF entities configured for the IP address, in this case the PCRF 13-2, and decides to check the validity of the selection.

(Selecting the PCRF entity at this point and deciding to check the validity of the selection has not been previously proposed.)

Step 9 of FIG. 5

The P-CSCF 12 sends a validation request to the selected PCRF 13-2 including the IP address identified in Step 8 of FIG. 5. As different implementation options, the validation request may either initiate a stand-alone transaction (unrelated to an AF session), or a new AF session. When an AF session is used for the validation, the P-CSCF 12 may create an association between this AF session and the IMS registration and/or the IMS signalling flow in the user plane.

(This step has not been previously proposed.)

Step 10 of FIG. 5

The PCRF 13-2 checks if it is serving this IP address. In this example, the result is unsuccessful because the selected PCRF 13-2 is not serving the UE 4.

(This step has not been previously proposed.)

Step 11 of FIG. 5

The PCRF 13-2 sends a failed validation response to the P-CSCF 12.

(This step has not been previously proposed.)

Step 12 of FIG. 5

Upon receipt of the failed validation response, the P-CSCF 12 may select another PCRF entity, if more than one is configured for the UE 4, and may re-attempt the validation, performing Steps 9 to 12 of FIG. 5 again for a different PCRF entity. This would continue until either a successful validation response is received (in which case Steps 12 to 14 of FIG. 4 could be performed) or until it is determined that no more PCRF entities can be identified. In this particular example, the result is unsuccessful.

(This step has not been previously proposed.)

Step 13 of FIG. 5

The P-CSCF 12 sends a failed registration response to the UE 4 as a result of the failed validation.

(This step has not been previously proposed.)

Step 14 of FIG. 5

The UE 4 may select another P-CSCF entity and re-attempt registration to the IMS.

One advantage of an embodiment of the present invention is the improved registration procedure, during which it is ensured that the policy control entities are correctly selected and addressed, avoiding otherwise possible IMS service rejections.

Another advantage is the possibility for the P-CSCF to be notified when IMS signalling flow between the UE and the GW is adversely affected, and therefore the possibility for the IMS to take appropriate actions in such conditions. This advantage is related to the second option described above in connection with Step 9 of FIGS. 4 and 5, in which an AF session is created between the P-CSCF and the PCRF at IMS registration. The IP flows authorised by the P-CSCF for this AF session correspond to the SIP signalling flows between the UE and the P-CSCF. This AF session will exist for the duration of the registration. Since an AF session is also a framework for the PCRF to notify an AF (here, the P-CSCF) of the loss of the bearer that carries the authorised flows, this option opens up the possibility for the P-CSCF to know when its SIP signalling flows are affected.

Although the above embodiments have been described in the context of UMTS and IMS, it will be appreciated that the same scheme can be implemented in a telecommunications network corresponding to UMTS having a subsystem of the network corresponding to IMS to which a mobile node would require registration. In the same way that UMTS/IMS does, such a network would have at least one node for maintaining or having access to policy and charging rules for users of the network (corresponding to the PCRFs as described above), at least one node for enforcement of the policy and charging rules to traffic flows (corresponding to the GWs as described above), and at least one proxy node (corresponding to the P-CSCFs as described above). The method would generally comprise receiving a registration request message from the mobile node at a proxy node of the network, selecting a candidate policy and charging rules node for the mobile node, determining whether the candidate policy and charging rules node has already been selected by a policy and charging rules enforcement node to serve the mobile node, and performing subsequent steps of the registration procedure in dependence on the determination.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

What is claimed is:

1. A method of registering a mobile node of a telecommunications network to a subsystem of the network, the network having a plurality of policy and charging rules function (PCRF) nodes for maintaining or having access to policy and charging rules for users of the network, a node for enforcement of the policy and charging rules to traffic flows, and a session management node, the method comprising the steps of:

receiving a registration request message from the mobile node at a proxy node of the network;

selecting from the plurality of PCRF nodes, a candidate PCRF node for the mobile node;

determining whether the candidate PCRF node has already been selected by the policy and charging rules enforcement node to serve the mobile node; and upon determining that the candidate PCRF node has already been selected by the policy and charging rules enforcement node to serve the mobile node, forwarding the registration request from the proxy node to the session management node to complete the registration of the mobile node to the subsystem of the network.

2. The method as claimed in claim 1, wherein the network is a Universal Mobile Telecommunications System network.

3. The method as claimed in claim 2, wherein the mobile node is a User Equipment of the Universal Mobile Telecommunications System.

4. The method as claimed in claim 2, wherein each PCRF node includes a Policy and Charging Rules Function of the Universal Mobile Telecommunications System.

5. The method as claimed in claim 2, wherein the policy and charging rules enforcement node comprises a Gateway Node of the Universal Mobile Telecommunications System.

6. The method as claimed in claim 2, wherein the proxy node comprises an Application Function of the Universal Mobile Telecommunications System.

7. The method as claimed in claim 2, wherein the proxy node comprises a Proxy Call Session Control Function of the Universal Mobile Telecommunications System.

8. The method as claimed in claim 2, wherein the subsystem is an IP Multimedia Subsystem.

9. The method as claimed in claim 1, wherein the determining step comprises the steps of:

sending a validation request from the proxy node to the candidate PCRF node, said validation request including information for use by the candidate PCRF node for determining whether the candidate PCRF node has already been selected by the policy and charging rules enforcement node to serve the mobile node, and basing the determination on a reply received from the candidate PCRF node.

10. The method as claimed in claim 9, wherein the validation request is sent as part of an Application Function session between the proxy node and the candidate PCRF node.

11. The method as claimed in claim 9, wherein the information comprises an IP address of the mobile node.

12. The method as claimed in claim 11, comprising checking whether the IP address of the mobile node is already stored in the candidate PCRF node.

13. The method as claimed in claim 1, wherein when it is determined that the candidate PCRF node has not already been selected by the policy and charging rules enforcement node to serve the mobile node, the method repeats the selecting and determining steps for one or more further candidate PCRF nodes from the plurality of PCRF nodes until either one candidate PCRF node is selected that has already been selected by the policy and charging rules enforcement node to serve the mobile node, or until there are no further candidate PCRF nodes to select from the plurality of PCRF nodes.

14. The method as claimed in claim 13, wherein if no candidate PCRF node is selected that has already been selected by the policy and charging rules enforcement node to serve the mobile node, the method includes rejecting the request to register the mobile node to the subsystem.

15. The method as claimed in claim 14, further comprising repeating the selecting and determining steps for a further proxy node.

16. An apparatus for use in registering a mobile node of a telecommunications network to a subsystem of the network, the network having a plurality of policy and charging rules function (PCRF) nodes for maintaining or having access to policy and charging rules for users of the network, a node for enforcement of the policy and charging rules to traffic flows, and a session management node, the apparatus comprising:
   means for receiving a registration request message from the mobile node;
   means for selecting from the plurality of PCRF nodes, a candidate PCRF node for the mobile node;
   means for determining whether the candidate PCRF node has already been selected by the policy and charging rules enforcement node to serve the mobile node; and
   means for forwarding the registration request from a proxy node to the session management node to complete the registration of the mobile node to the subsystem of the network in response to determining that the candidate PCRF node has already been selected by the policy and charging rules enforcement node to serve the mobile node.

17. A method of selecting a policy and charging rules function (PCRF) node from a plurality of PCRF nodes for providing policy and charging rules for users of a telecommunications network as part of a process of registering a mobile node of the telecommunications network to a subsystem of the network, the network having a proxy node and a node for enforcement of the policy and charging rules to traffic flows, the method comprising the steps of:
   receiving at the proxy node of the network, a registration request message from the mobile node;
   selecting from the plurality of PCRF nodes, a candidate PCRF node for the mobile node;
   continuing the registration of the mobile node when the candidate PCRF node has already been selected by the policy and charging rules enforcement node to serve the mobile node; and
   when it is determined that the candidate PCRF node has not already been selected by the policy and charging rules enforcement node to serve the mobile node, repeating the selecting and determining steps for one or more further candidate PCRF nodes from the plurality of PCRF nodes until either one candidate PCRF node is selected and for which it is determined that the selected candidate PCRF node has already been selected by the policy and charging rules enforcement node to serve the mobile node or until there are no further candidate PCRF nodes to select from the plurality of PCRF nodes; and
   rejecting the registration request when there are no further candidate PCRF nodes to select from the plurality of PCRF nodes.

18. An apparatus in a policy and charging rules function (PCRF) node for providing policy and charging rules for users of a telecommunications network having a gateway node, a proxy node, and a session management node, said apparatus being utilized in a process of registering a mobile node of the telecommunications network to a subsystem of the network, the apparatus comprising:
   means for receiving an authorization request from the gateway node, said authorization request including an identifier of the mobile node and a request for the PCRF node to serve the mobile node;
   means for storing the identifier of the mobile node when the authorization request is received from the gateway node;
   means for receiving a validation request from the proxy node of the network, said validation request including the identifier of the mobile node and querying whether the PCRF node has been requested by the gateway node to serve the mobile node;
   means for determining whether the apparatus has stored the identifier for the mobile node; and
   means for sending a response to the proxy node indicating that the PCRF node has been requested by the gateway node to serve the mobile node when the apparatus has stored the identifier for the mobile node, and for sending a response to the proxy node indicating that the PCRF node has not been requested by the gateway node to serve the mobile node when the apparatus has not stored the identifier for the mobile node;
   wherein the proxy node is configured to send a registration request to the session management node to register the mobile node to the subsystem of the network when the response from the PCRF node indicates that the PCRF node has been requested by the gateway node to serve the mobile node.

19. A non-transitory computer program loaded onto an internal memory of a proxy node of a telecommunications network having a plurality of policy and charging rules function (PCRF) nodes for maintaining or having access to policy and charging rules for users of the network, and a node for enforcement of the policy and charging rules to traffic flows, the computer program comprising software code portions for causing the proxy node to perform the following steps when the computer program is run on a processor of the proxy node:
   receiving a registration request message from a mobile node;
   selecting from the plurality of PCRF nodes, a candidate PCRF node for the mobile node;
   determining whether the candidate PCRF node has already been selected by the policy and charging rules enforcement node to serve the mobile node;
   continuing a registration procedure for the mobile node when the candidate PCRF node has already been selected by the policy and charging rules enforcement node to serve the mobile node; and
   when the candidate PCRF node has not been selected by the policy and charging rules enforcement node to serve the mobile node, repeating the selecting and determining steps for further candidate PCRF nodes from the plurality of PCRF nodes until either the proxy node selects a candidate PCRF node that has already been selected by the policy and charging rules enforcement node to serve the mobile node, or until there are no further candidate PCRF nodes to select from the plurality of PCRF nodes.

* * * * *

UNITED STATES PATENT AND TRADEMARK OFFICE
CERTIFICATE OF CORRECTION

PATENT NO. : 8,175,576 B2  
APPLICATION NO. : 12/278487  
DATED : May 8, 2012  
INVENTOR(S) : Przybysz et al.

It is certified that error appears in the above-identified patent and that said Letters Patent is hereby corrected as shown below:

In Column 1-2, Lines 64-67 and 1-7, delete "The IMS makes...within the IMS." and insert the same at Line 65 as a new paragraph.

Signed and Sealed this
Ninth Day of October, 2012

David J. Kappos
*Director of the United States Patent and Trademark Office*